Dec. 8, 1942. H. C. PIERCE ET AL 2,304,765
METHOD OF SORTING CITRUS FRUITS AND THE LIKE
Original Filed Aug. 20, 1937 4 Sheets-Sheet 4
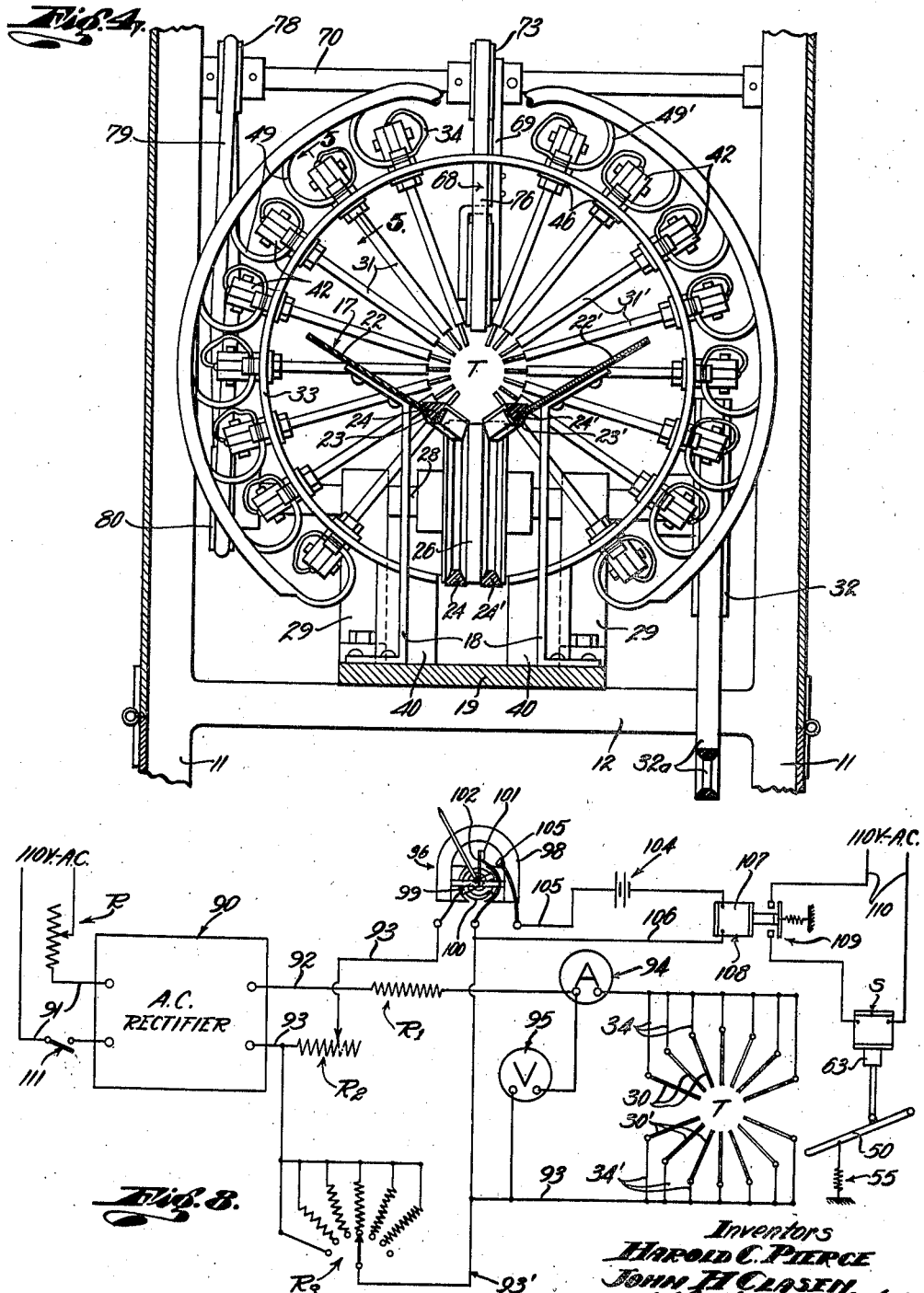
Inventors
HAROLD C. PIERCE
JOHN H. CLASEN
Attorney Patented Dec. 8, 1942

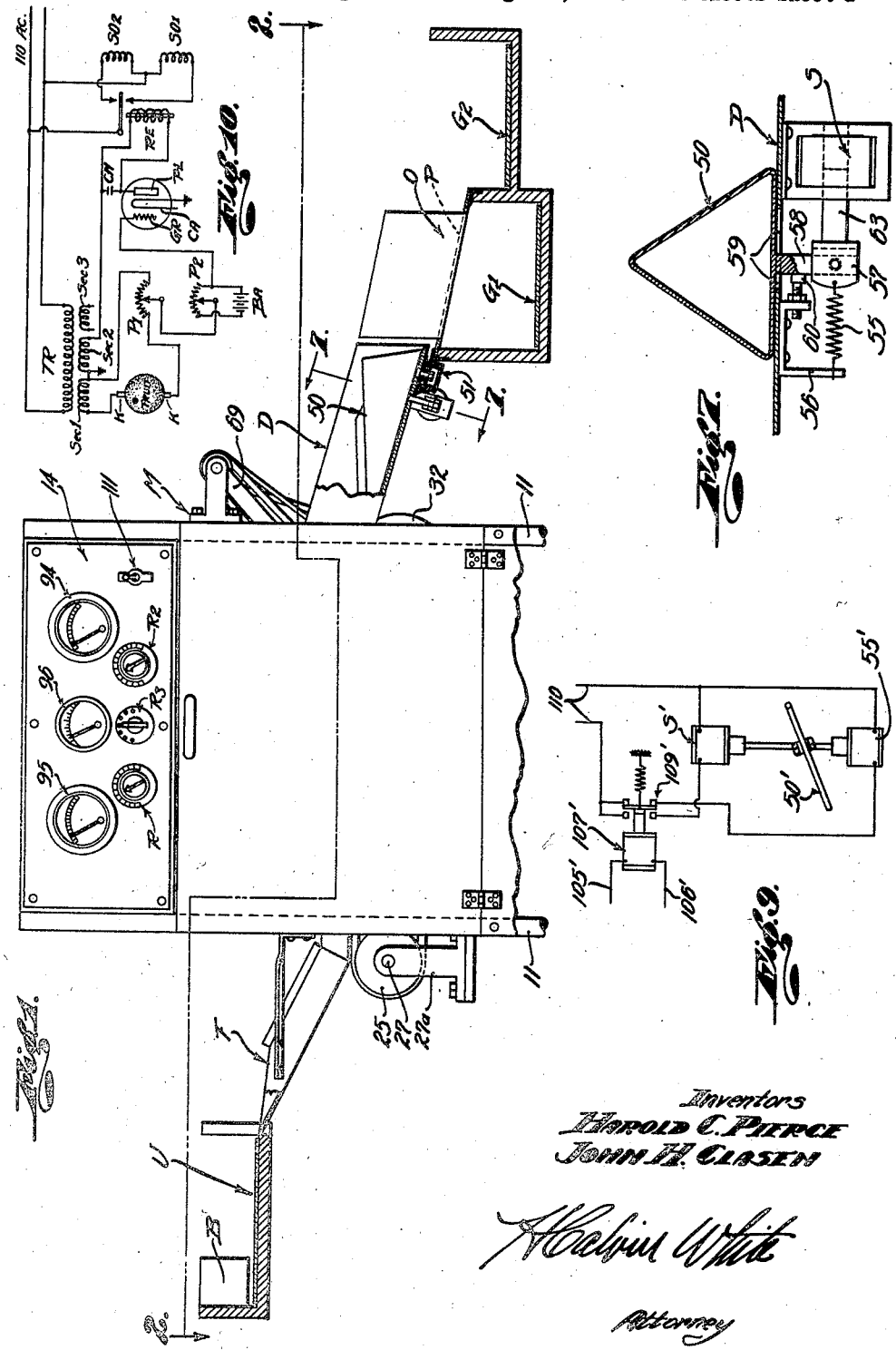

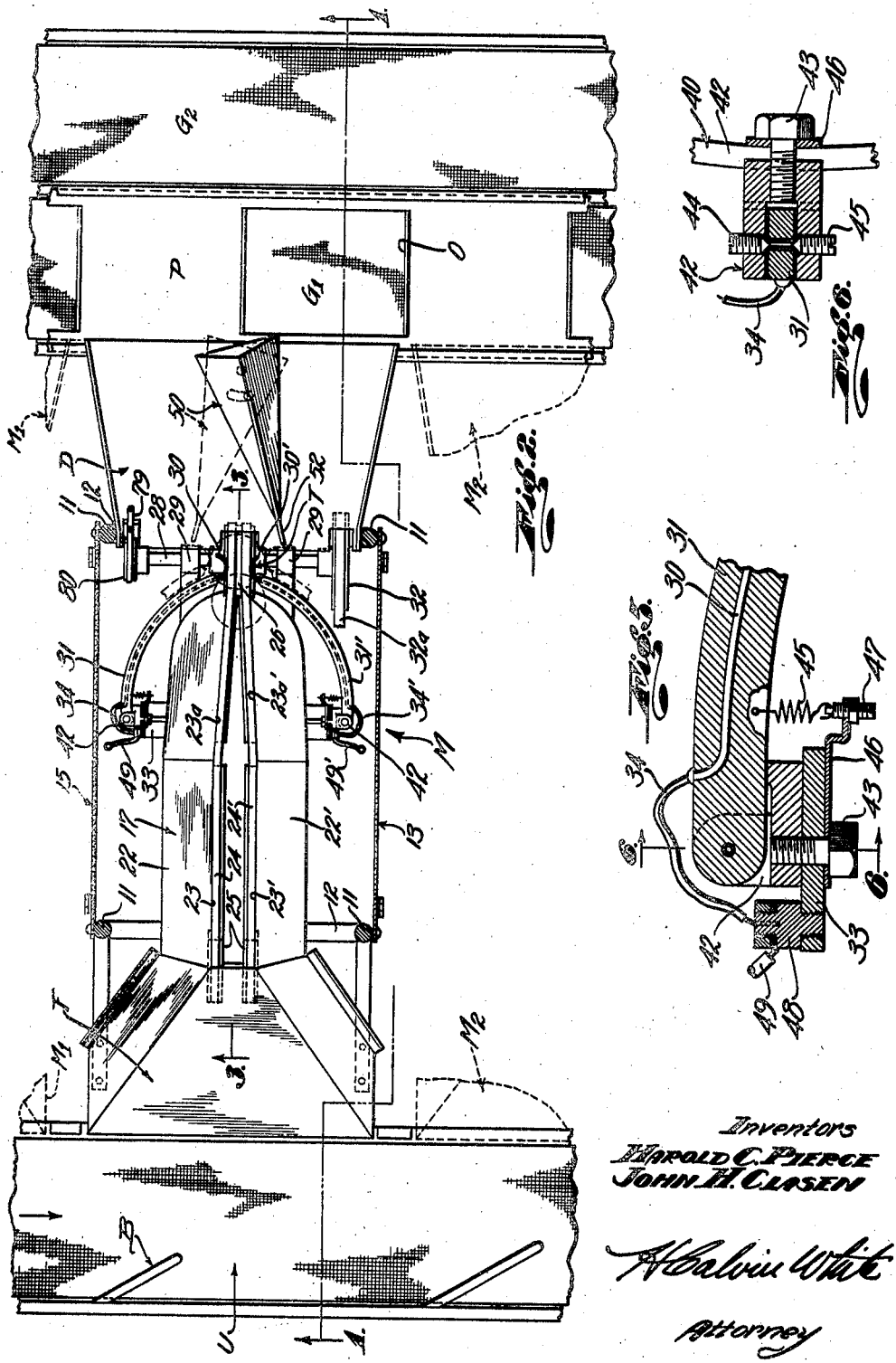

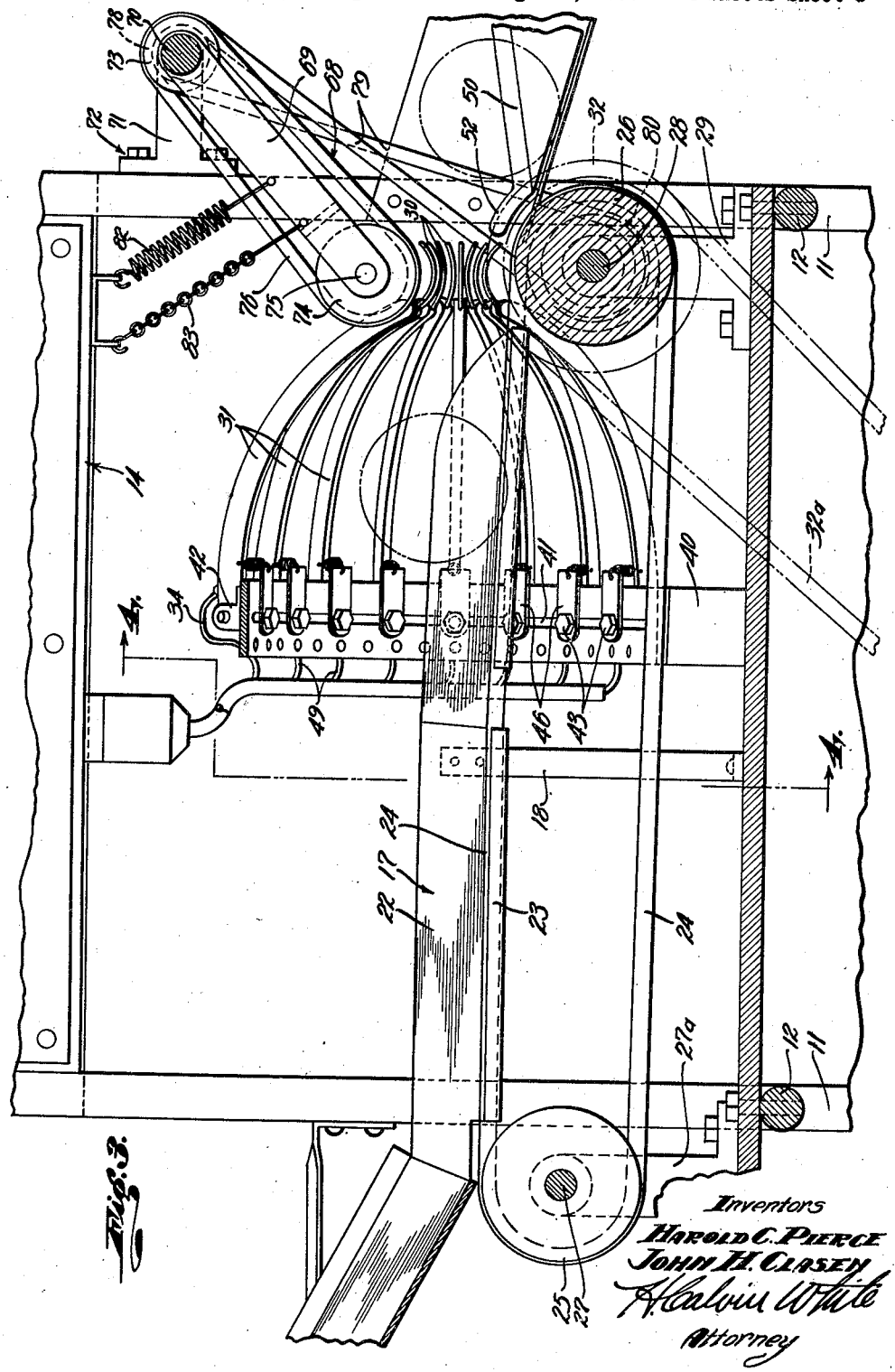

2,304,765

UNITED STATES PATENT OFFICE 2,304,765

METHOD OF SORTING CITRUS FRUITS AND THE LIKE

Harold C. Pierce, Pomona, and John H. Clasen, Anaheim, Calif.; said Clasen assignor to said Pierce Substituted for abandoned application Serial No. 160,086, August 20, 1937. This application March 24, 1941, Serial No. 384,888

9 Claims. (Cl. 209—81)

This invention has to do in a general way with sorting machines, and is more particularly related to machines for automatically sorting citrus fruits and the like for the purpose of grading or classifying such fruits in accordance with differences in their internal conditions. The present application is substituted for our now abandoned application Serial Number 160,086, filed August 20, 1937, allowed September 27, 1940, on Method of sorting citrus fruits and the like.

It is well known to those familiar with the art that the pulp or edible portion of citrus fruits may be rendered unfit for consumption by freezing or by various diseases such as center-rot, while the external appearance of such frozen or otherwise spoiled fruit is no different from fruit which is perfectly sound. This property makes it extremely difficult for packing houses to make a separation of the sound from the unsound fruits, particularly in seasons where the crop has been subjected to a heavy freeze and a cutting or slicing test shows a large percentage of the fruit to be unmarketable.

So far as we are aware, there are only two methods which, prior to the development of this invention, have been used with any degree of satisfaction to effect any kind of separation between sound and unsound fruit where there is no outward manifestation of a bad internal condition.

The oldest and most commonly used method in which an attempt is made to separate frozen from unfrozen fruits is what is known as the "float test." This method involves the use of a large tank or vat containing baffles and trays, and filled with water or other suitable solution in which an attempt is made to separate the frozen fruit from the good fruit by a difference of specific gravity between the two types of fruits. The equipment for this method requires a large amount of space, it is difficult to operate and has no means of accurate control and is not entirely reliable. For example, it has been found that the fruit discarded as bad in the float test will run as high as 30% good fruit which will pass the marketing inspection.

The other and more recent development for the purpose of grading fruit of this character, involves an X-ray examination of the fruit. This procedure is extremely slow even as compared to the float test; furthermore it requires the constant presence of an experienced operator and the equipment is expensive. The space required for the equipment is large since the method can only be operated in a dark room and the operator is liable to injury due to prolonged exposure to X-rays.

It is the primary object of this invention to provide an improved method and apparatus for sorting citrus fruit and the like which has none of the disadvantages attending the methods and devices discussed above.

As indicated, the invention also is adaptable to the sorting of sound fruit from that affected by diseases resulting from causes other than freezing. Among the common diseases or conditions of spoilage in citrus fruit (to which we refer generally as internal decline) are the alternaria type of internal decay, stem end decline, transparent rot (which first affects the skin and then progresses inwardly, without being apparent to the eye), and crystallization, which results in disappearance of the juice and resultant internal drying. These conditions are prevalent in lemons, and in Valencia oranges, particularly the larger sizes.

Prior to the present invention, there has been no known method or device capable of testing or sorting fruit affected by any of these types of internal decline, without actual cutting and destruction of the fruit tested. Accordingly, the long standing practice has been to cut open and inspect a representative number of fruits in a lot of particular size, or a quantity obtained from a particular source, and where internal spoilage is found to exist, to discard for by-products or reduce to a lower grade the entire lot of fruit. A particularly serious development frequently results from the storage, even in boxes, of a quantity of the fruit, especially lemons, in which some form of internal decline may be present. Even a single affected piece of the fruit may cause the disease to spread progressively to others, and in fact throughout the entire lot in storage. Particularly is this true where the diseased fruit exudes a liquid which contacts other fruits and carries the diseased condition to them.

The present method provides a means for segregating such diseased fruits from the sound fruit, not only where the diseased condition is fully developed, but in its early states as well (when the differences may largely consist of abnormal variations in acid or sugar content). Consequently, it now becomes possible to separate from a lot which normally would be considered reject or low grade fruit, all the first grade or perfectly sound fruit. The latter thus may reliably be marketed as such, and only the unsound fruit discarded. Especially important is the possibility of first sorting from fruit going to storage, all pieces that have appreciable decline at the time, and to thereby obviate spreading of the disease during storage, and the large spoilage losses that customarily result from this cause.

The invention is predicated upon the discovery that if an electric potential is applied across a citrus fruit, such as an orange for example, the current flowing in the circuit which applies the potential will vary with fruits of different internal conditions, and the amount of such variations caused by these differences in internal conditions is substantially greater than the variation caused by differences in size between fruits of the same internal conditions. We have discovered, for example, that for satisfactory results in sorting sound from unsound citrus fruits a direct current (rectified A. C.) potential having a voltage in the neighborhood of from 100 to 500 volts may be used, and the resistance of the circuit through which this potential is applied to the fruit is preferably such that the current flowing with a fruit interposed in the circuit is relatively small, varying for example from 1 to 10 milliamperes. As will later appear, the invention also is readily adaptable to the use of an alternating current potential for segregating fruits characterized by differential conductivities or resistances.

When fruit which has been frozen so that the cell structure is broken down and the water or juice within the fruit has penetrated through the fiber structure therein, is interposed in a circuit of the class described, the amount of current flowing through the circuit is substantially greater than the amount of current which will flow when a perfectly sound or unfrozen fruit is interposed in the same circuit under the same potential. There may of course be other conditions for which grading or separation is to be made where the unsound fruit will cause a greater or smaller current to flow in the circuit than the sound fruit, but in any event we have discovered that the differences in current flowing caused by differences in internal condition are substantially greater than any variations in current value which may be attributed to differences in size between fruit of the same internal condition.

The current value of course depends upon the voltage applied to the circuit and the resistance of the circuit extrinsic to the resistance of the interposed fruit, and for full flexibility of control in separating or grading different lots of fruit and in grading for different internal conditions, we consider it preferable to adjust the voltage and resistance for these different lots or conditions. Such adjustment is a further feature of the invention and is generally made empirically by selecting a box or crate of fruit from the lot to be graded or sorted, arbitrarily setting the applied voltage and the resistance of the circuit, and then passing say 10 fruits through the circuit and separating them in accordance with the current indications obtained. Fruit thus separated is then cut or sliced and examined or tested for the quality separation that is to be made. If the desired percentage separation is not obtained, the controls may be reset and another small lot of fruit separated in the same way until the desired percentage separation is obtained, after which the entire lot of fruits is run through the machine with the controls set in this way.

The separation of the fruit through the electrical method and apparatus contemplated by this invention may be made manually by interposing the fruit in the circuit and observing the currents flowing through the circuit with different fruits interposed therein on a milliammeter. It is, however, one object of the invention to provide a machine which is entirely automatic and with a view to accomplishing this, the invention contemplates the use of the different values obtained with different fruits for controlling a fruit directed member which will automatically sort or grade the fruit into two separate grades.

It frequently happens that the entire pulp structure of the fruit will not be bad but that there will be a bad spot or spots within the fruit rendering it unfit for use. With a view to separating such fruit from the fruit that is perfectly sound, the invention contemplates a novel form of contacting means whereby the fruit may be interposed in the electrical circuit above referred to.

In this regard, it is a further object of this invention to provide contacting means of the class described which is in the nature of an expansible throat that will automatically accommodate fruit of various sizes.

Further details in the method contemplated by this invention and the details in the construction of an apparatus for practicing the method, together with other objects attending the production of the method and apparatus, will be best understood from the following detailed description of the accompanying drawings, which are chosen for illustrative purposes only, and in which:

Fig. 1 is a partial elevation with parts in section illustrating a preferred embodiment of our invention, such view being taken along the line 1—1 of Fig. 2;

Fig. 2 is a plan section taken along the line 2—2 of Fig. 1;

Fig. 3 is an enlarged fragmentary sectional elevation taken along the line 3—3 of Fig. 2, and showing the fruit directing member as having been swung up into an intermediate center position, where it will lie in the section plane;

Fig. 4 is an enlarged fragmentary sectional elevation taken along the line 4—4 of Fig. 3;

Fig. 5 is an enlarged fragmentary sectional elevation showing the supporting structure for one of the contacting arms or fingers, and may be considered as having been taken in a plane represented by the line 5—5 of Fig. 4;

Fig. 6 is a sectional elevation through the arm support, and is taken on a plane represented by the line 6—6 of Fig. 5;

Fig. 7 is a sectional elevation of the fruit directing member and its operating mechanism, and is taken on the line 7—7 of Fig. 1;

Fig. 8 is a wiring diagram illustrating a preferred circuit which we have used in the method and apparatus contemplated by this invention;

Fig. 9 is a wiring diagram illustrating a modification in the invention; and

Fig. 10 is a wiring diagram illustrating a system for separating the fruit by an alternating current circuit.

Referring now to the drawings for a more detailed description of the invention with particular reference to Figs. 1 and 2, the sorting or grading machine is generally indicated by the reference letter M, and is shown as being provided with a feed chute F over which ungraded or unsorted fruit is delivered into the machine from a traveling conveyor U, such conveyor being equipped with a baffle board B for directing the fruit into the feed chute. The machine is also provided with a discharge chute D over which the fruit, divided into two grades in the manner to be later described, is delivered onto traveling conveyors $G_1$ or $G_2$, depending upon the grade into which the fruit falls.

In this regard it will be understood that various means may be employed for delivering the fruit into and receiving the fruit from the machine, but in a continuous automatic process the arrangement shown is preferable, such arrangement lending itself to the use of a plurality of machines arranged in parallel between the two conveyors U and $G_1$, $G_2$, in the manner indicated at $M_1$ and $M_2$ in Fig. 2.

The sorting machine contemplated by this invention is shown as being supported in a main frame comprised of standards or legs 11 and cross members 12, such frame being shown as having cover plates 13. The upper end of the frame carries a case or housing 14 which conveniently contains the various elements of the electrical circuit to be hereinafter described.

The fruit delivered into the machine by the feed chute F is received in a trough 17, which is supported by standards 18, carried upon a base plate 19, which in turn is mounted on the cross members 12. The trough 17 is comprised of outwardly flared side members 22 and 22', which are provided at the bottom edges with grooves 23 and 23' adapted to contain and guide the upper runs of conveyor belts 24 and 24'. The conveyor belts 24 and 24' run over grooved pulleys 25 and 26, which are situated in opposite ends of the frame. The pulleys 25 are carried on a shaft 27 which is supported by bearing standards 27a and the pulley 26 is keyed to a shaft 28 supported by bearing standards 29, said shaft being provided with a drive pulley 32, which is adapted to be driven by a belt 32a from any suitable source of power such as an electric motor, not shown.

It will be observed that the bottom of the trough is defined by these belts 23 and 23', and from Fig. 2 it will be observed that the forward portion of the trough is formed so that the guide grooves 23a and 23a' therein converge toward each other as they approach the pulley 26. Thus the belts 24 and 24' converge toward each other at the discharge end of the unit, and a narrow pulley may therefore be used at the discharge end of the unit.

As a fruit traveling along the bottom of the trough 17 approaches the discharge chute D, it is moved by the traveling belts 24 and 24' into what we have termed an expansible contact throat, generally indicated by the letter T. This throat T is comprised of oppositely disposed electrical conductive contacts 30 and 30', which may be made and supported in any suitable manner but which are shown as being of arcuate shape and as being supported by curved arms 31 and 31' formed of an insulating material such as Bakelite or hard rubber. The arms are pivoted at outer ends to a circular frame member 33, which is shown as surrounding the conveyor trough. The contact members 30 and 30' are shown as being the exposed ends of conducting wires, indicated by the same reference numerals, which in the form of the invention are embedded in the arms 31 and 31' and have flexible conductors 34 and 34' soldered or otherwise attached to their outer ends. These flexible conductors 34 and 34' are connected on opposite sides of the electric circuit to be hereinafter described, and it is through such connections that an electrical potential is applied across a fruit which is engaged in the throat formed by the conductors 30 and 30'.

The contact throat T as shown in Fig. 2 is, for convenience of illustration, shown as comprising only two contact members and their associated arms, and while the device may be made to operate with only two such contacts, we consider it preferable for the purpose of sensitivity and further for the purpose of obtaining electrical indication from fruit which may be frozen or spoiled in only one spot or region, to employ a plurality of these contact members. Such contact members are preferably arranged in two sets corresponding to the contacts 30 and 30', the individual members of each set being connected in parallel. In this way it will be seen that, with the circuit adjusted so that the desired separating actuation is obtained by any current value exceeding that which prevails when all of the contact members are carrying the current conducted through a good orange, and if there is a bad spot in the interposed orange, the decreased resistance resulting from such spot will give the desired indication or separating actuation to discard such fruit.

As previously pointed out, these contact members may be formed and supported in various ways, but it is desirable that they be arranged so that the throat comprised thereby is expansible to accommodate for different sizes of fruit. In the present embodiment of the invention we have accomplished this through the use of swinging arms which are pivoted on the frame or annulus 33.

This frame 33 is shown as being supported by standards 40 carried on the base plate 19, and in order that the number of arms may be varied and their relative positions may be changed, the frame is shown as being slotted as indicated at 41. The arm supports are shown as comprising bifurcated bracket plates 42, which are secured to the annulus 33 by screws 43 extending through the slot 41. The arms may be pivoted in the bifurcated plate in any suitable manner such as by means of needle point bearing pins or screws 44 and 45 (see Fig. 6). The arms 30, etc., are biased inwardly toward the axis of the throat, by any suitable means such as tension springs 45 which are shown as being attached to the arm and to an extension plate 46 on the annulus. It is important to the most sensitive operation of the device that all of the contacting members engage the fruit with uniform pressure and with this in mind the springs (as illustrated in Fig. 5) may be attached to adjusting bolts 47 whereby they may all be adjusted to act upon their respective arms with the same tension.

The annulus 33 is also shown as being provided with a plurality of insulating binding posts 48, which are shown as being threadedly attached thereto, such posts receiving the ends of the flexible conductors 34 and conductors 49, through which the parallel connection of each set of contacts to each other and their connection to one side of the circuit is made.

In the present embodiment of our invention, the fruit discharged through the throat T onto the chute D is directed in one direction or the other by means of a vane member 50, pivotally mounted on the bottom of the chute as indicated at 51. This vane member is shown as being of triangular cross section (see Fig. 7) and is provided with an extending finger 52 adapted to swing adjacent the discharge end of the throat T so that it will be engaged by a fruit leaving the throat in the event the vane is swinging at that time.

This vane 50 is normally held in the full line position shown in Fig. 2 by means of a tension spring 55 which has one end attached to a bracket 56 on the under side of the chute D, and which has its other end attached through a collar 57 to a pin 58 which is mounted on the under side of the frame and extends downwardly through an arcuate slot 59 in the bottom of the chute D. An adjustable stop 60 is provided for fixing the normal position of the vane.

The vane is adapted to be drawn in the opposite direction to the dotted line position shown in Fig. 2 by a solenoid S, the armature 63 of which is attached to the collar 57.

With the arrangement just described, it will be seen that when the solenoid S is energized through the medium of a fruit engaged in the throat, it will be held in the dotted line position only during such time as the fruit is in contact with the throat, and as soon as the fruit is fully discharged the vane is immediately swung back to its full line position by the spring 55. The extending finger 52, however, is effective to engage the fruit thus discharged as the vane is swinging from the dotted line to the full line position, and thereby directs such fruit along the proper side of the chute D.

For the purpose of insuring that the fruit engaged in the throat is drawn completely through the throat and is discharged onto the chute D, we consider it preferable to provide a second traveling member, generally indicated by reference numeral 68, which is adapted to engage the top of a fruit passing through the throat, and which cooperates with the conveyor belts 24 and 24' to insure the continued movement of the fruit through the throat. This traveling member 68 is shown as comprising a lever member 69 which is swingably mounted on a shaft 70 carried by brackets 71, which are attached to the frame as indicated at 72. Keyed to the shaft 70 is a pulley 73 which cooperates with a pulley 74 mounted on a shaft 75 in the free end of the lever member 69, to carry a traveling belt 76. For the purpose of driving the shaft 70 and imparting traveling movement to the belt 76, the shaft is provided with a drive pulley 78 which is engaged by a belt 79, such belt being driven by a pulley 80 on the shaft 28.

In this form of the invention the lever member 69 is counter-balanced by a tension spring 82, and its downward swinging movement is limited by a flexible member, such as a chain 83.

Referring now to Fig. 8 for a detailed description of an electrical circuit which we have advantageously used in the practice of the invention, reference numeral 90 indicates diagrammatically an alternating current rectifying unit which may be of any conventional type. The rectifier may be an ordinary full wave rectifier such as is used in radio circuits, which includes a transformer, a rectifying tube, and a condenser. The primary leads to the transformer are indicated by reference numeral 91 and the characteristics of the rectifying unit are such that by adjusting the variable resistance R in the primary lead, the output voltage may be varied from 300 to 500 volts.

The output leads from the rectifying unit are indicated by reference numerals 92 and 93. The lead 92 contains a resistance $R_1$ and a milliammeter 94, and the conductors 34 which lead to the contact members 30 are connected in parallel with this conductor 92.

The other conductor 93 of the rectifier output circuit contains a variable resistance $R_2$, a "miniature relay" generally indicated by reference numeral 96, and the conductors 34' which lead to the contact members 30' in the throat T are connected in parallel to this conductor 93. Connected across the miniature relay 96 as indicated at 93', we provide a point selector-type rheostat, generally indicated by reference letter $R_3$. A voltmeter 95 is connected across the conductors 92 and 93.

The miniature relay 96 operates on the principle of an ammeter, such relay embodying a permanent magnet 98, a coil 99 which is connected across the conductor 93, and a return spring 100. The switch of the relay is comprised of a contact member 101 mounted on an arm 102 which is attached to the coil shaft, and a fixed contact 103. It will thus be seen that variations of the current flowing through the circuit will tend to swing the contact 101 toward the fixed contact 103, but such contacts will be swung into engagement only when a predetermined current value is exceeded.

The closure of the switch comprised of contacts 101, 103 completes a circuit from a battery 104 through conductors 105 and 106 and the coil 107 of a secondary relay indicated at 108. The actuation of the secondary relay 108 closes a switch 109 in a circuit 110 which energizes the solenoid S to draw the vane member 50 into the dotted line position shown in Fig. 2.

As previously pointed out, the characteristics of the rectifier 90 are such that with 110 volts alternating current applied thereto through the primary conductors 91, the output potential may be varied from 100 to 500 volts through the medium of the rheostat R. In the circuit which we have used, the resistance $R_1$ is a fixed resistance of substantially 15,000 ohms, and the variable resistance $R_2$ has a maximum resistance of 150,000 ohms.

The selector rheostat $R_3$ in the shunt conductor 93' is of a type such that it may be completely cut off to open the shunt circuit and the various point contact resistances from 0.2 megohm to 3 megohms. With this arrangement, it will be seen that by varying the potential applied to the circuit and by varying the resistance of the circuit extrinsic of a fruit interposed in the throat T, the ratio of the current flowing through the extrinsic portion of the circuit to the current flowing through the fruit may be varied to produce corresponding variations in the sensitiveness with which the internal condition of the fruit may be indicated by the milliammeter 94 or by the actuation of the miniature relay 96. It will be understood, of course, that the circuit shown here is merely illustrative and may be varied without departing from the scope of the invention; also that it will be provided with a control switch as indicated at 111.

In the operation of the device, we consider it preferable that the fruit to be graded or sorted be previously dried, and in packing house operation with this in mind, we consider it preferable that the sorting machine be employed after the fruit has been washed. The fruit may also be waxed and dried, so that the surface condition of the fruit is uniform. It is also preferable to adjust or set the device for different lots of fruit such as are obtained, for example, from different groves. This is done, in the manner previously described, by taking a representative sample and with the circuit adjustments arbitrarily set, passing a certain number of fruits through the machine and then inspecting the sorted fruits to determine whether or not the desired percentage separation has been made. If it is desired to change the percentage separation, the circuit is again adjusted and a second small lot from this representative sample is passed through the machine and inspected by a cutting or slicing test. This operation is continued until a setting or adjustment which gives the desired percentage separation is obtained, after which the entire lot of fruit is passed through the machine. To secure greater uniformity in the conditions under which the pieces of fruit pass through the electric field or engage the contact fingers, it may be advantageous to pass the fruits through the throat in the same relative positions, e. g., with their stem ends or blossom ends forward, or in the case of non-spherical fruit such as lemons, with the long axis of the fruit in the direction of the axis of the throat, i. e., the path of movement of the fruit through the throat.

In operating machines for separating frozen fruits, for example, which have not had an opportunity to stand over a prolonged period of time so that the frozen fruit has become "dried out," the current flowing through the circuit with a frozen fruit interposed in the throat T may be substantially greater than the current flowing with a sound fruit interposed in the throat. Thus with the circuit properly adjusted when a frozen fruit is engaged in the throat T, the current flowing is sufficient to swing the contacts 101 and 103 of the miniature relay 96 into engagement, thus completing a circuit through the battery 104 to the relay 107 which energizes the circuit to the solenoid S. In this way the deflecting member 50 is drawn to the dotted line position shown in Fig. 2, and as the fruit is discharged it is engaged by the finger 52 on the directing vane, thus following down the right side of the chute D through the opening O onto the conveyor belt $G_1$. If a sound fruit is interposed in the throat, the current flowing is insufficient to draw the contact members 101 and 103 into engagement, the deflecting vane 50 remains in its full line position shown in Fig. 2 and the fruit is directed downwardly along the left side of the chute D across the plate P onto the conveyor $G_2$.

In order that the conveyor belts $G_1$ and $G_2$ may be alternatively used to convey the two different grades of fruit separated by the machine, we have made the plate P slidably mounted on a support over the conveyor belt $G_1$ so that it can be shifted to the point where the opening O is beneath the left side of the chute, and the plate portion thereof is positioned so as to direct the fruit which energizes the solenoid onto the conveyor belt $G_1$.

In Fig. 9 we have shown a modification in the mechanism for actuating the directing vane 50' in which the spring 55 of Fig. 8 has been replaced by a second solenoid 55'. The relay 107' which is energized from conductors 105' and 106' has a double acting switch 109' connected respectively to solenoids S' and 55' so that the two movements of the vane 50' are effected respectively by the solenoids S' or 55'.

As we have previously pionted out, the device may be used not only to sort unsound fruit from marketable fruit, but it may also be used to grade fruit in accordance with its acid or sugar content. This is done by adjusting the applied voltage and the resistance of the circuit so that the miniature relay will operate to close the contacts 101 and 103 when fruit having an acid content exceeding a predetermined value is interposed in the throat T so that the device may be used for grading fruit in accordance with its sweetness. Likewise, separations may be made in accordance with other conditions in the fruit which are evidenced by differences in resistance, and it will be seen that by using two or more machines, or contact units in tandem, with the energizing circuits adjusted to energize the successive associated deflectors in accordance with different grades of fruit, the fruit may be separated into various grades in one continuous operation.

It will be understood that the invention is not limited to the use of a direct current type of fruit selector circuit, and that an alternating current circuit may be used to equal advantage, and in fact preferentially for many purposes. A typical circuit designed to apply an alternating current potential through the fruit is illustrated in Fig. 10. Herein the transformer T may have several secondaries, including sec. 1 from which current is sent through the fruit and potentiometer $P_1$. Another secondary, designated sec. 2 and grounded as illustrated, sends current through cathode CA of a suitable vacuum tube through plate PL and relay RE when the grid GR is positive. The grid GR is biased back by potentiometer $P_2$ and battery BA so that with no fruit between the contacts K, the relay does not operate. This biased potential is overcome when current passes through good fruit and a potential set up by such current through $P_1$ subtracts from the battery potential to cause the plate current to flow on half wave of sec. 2, operating relay RE and charging condenser CN. On the other half wave, the condenser maintains current through relay RE. When fruit of high resistance engages the contacts, the potential of $P_1$ is not sufficient to operate the relay. This relay operates solenoids $SO_1$ and $SO_2$ which may cause a shift lever (not shown) to operate in segregating the good from bad fruit, all in a manner similar to the operation of the shift lever in the previously described embodiment. Sec. 3 may be used for a tube heater (not shown), as will be readily appreciated by those familiar with the art.

Where, in the claims, we refer to fruit affected by internal decay, it is intended to include by such term all the various types of decay or internal decline more fully discussed in the introduction hereof, which render the fruit capable of separation in accordance with variations in their electrical resistances or conductivities caused by such decay.

We claim:

1. The method of separating sound fruit entities from unsound entities of the same kind of fruit and affected by one of the following: internal decay and an internal condition resulting from freezing; said method including subjecting said fruit entities to an electrical potential applied exclusively externally thereto so that the current penetrates said entities and separating the fruit entities in accordance with their different conductivities when subjected to said potential.

2. The method of separating sound fruit entities from unsound entities of the same kind of fruit and affected by one of the following: internal decay and an internal condition resulting from freezing; said method including subjecting said fruit entities to an electrical direct current potential applied exclusively externally thereto so that the current penetrates said entities, and separating the fruit entities in accordance with their different conductivities when subjected to said potential.

3. The method of separating sound fruit entities from unsound entities of the same kind of fruit and affected by one of the following: internal decay and an internal condition resulting from freezing; said method including subjecting said fruit entities to an electrical alternating current potential applied exclusively externally thereto so that the current penetrates said entities, and separating the fruit entities in accordance with their different conductivities when subjected to said potential.

4. The method of separating sound fruit entities from unsound entities of the same kind of fruit and affected by one of the following: internal decay and an internal condition resulting from freezing; said method including subjecting said fruit entities to an electrical potential applied exclusively externally thereto and directly against the surfaces of said entities so that they are penetrated by the current, and separating the fruit entities in accordance with their different conductivities when subjected to said potential.

5. The method of separating sound fruit entities from unsound entities of the same kind of fruit and affected by one of the following: internal decay and an internal condition resulting from freezing; said method including subjecting said fruit entities to an electrical potential applied across diameters thereof but without penetrating the surfaces of said entities, and separating the fruit entities in accordance with their different conductivities when subjected to said potential.

6. The method of separating sound fruit entities from unsound entities of the same kind of fruit and affected by one of the following: internal decay and an internal condition resulting from freezing; said method including subjecting said fruit entities to an electrical potential applied directly against substantially diametrically opposed points on the surfaces of said entities but without penetrating said surfaces, and separating the fruit entities in accordance with their different conductivities when subjected to said potential.

7. A method of separating sound fruit entities from unsound entities of the same kind of fruit, the unsound entities being affected by one of the following: internal decay, and an internal condition resulting from freezing; said method including subjecting said fruit entities to an electrical unidirectional potential applied to opposite points on the surface of each fruit entity without penetrating said surface, and separating said entities in accordance with their different conductivities when subjected to said potential.

8. A method of separating sound fruit entities from unsound entities of the same kind of fruit, the unsound entities being affected by one of the following: internal decay, and an internal condition resulting from freezing; said method including subjecting said fruit entities to electrical unidirectional potential directed through a plurality of paths within each fruit entity from opposite sides of the surface thereof without penetrating said surface, and separating said sound and unsound entities in accordance with their conductivities when subjected to said potential.

9. A method of separating sound fruit entities from unsound entities of the same kind of fruit, the unsound entities being affected by one of the following: internal decay, and an internal condition resulting from freezing; said method including first washing, drying and waxing the fruit to provide uniform surface conditions, then subjecting said fruit entities to an electrical unidirectional potential applied to opposite points on the surface of each fruit entity without penetrating said surfaces, and separating said entities in accordance with their different conductivities when subjected to said potential.

HAROLD C. PIERCE.
JOHN H. CLASEN.